(12) United States Patent
Gumpoldsberger

(10) Patent No.: US 7,604,562 B2
(45) Date of Patent: Oct. 20, 2009

(54) DRIVE AXLE FOR A LIGHT VEHICLE

(75) Inventor: Thomas Gumpoldsberger, Ennskraftstr. 21 (AT)

(73) Assignee: Engineering Center Steyr GmbH & Co. KG, St. Valentin (AT)

(*) Notice: Subject to any disclaimer, the term of this patent is extended or adjusted under 35 U.S.C. 154(b) by 339 days.

(21) Appl. No.: 11/514,369

(22) Filed: Aug. 31, 2006

(65) Prior Publication Data

US 2007/0066438 A1    Mar. 22, 2007

(30) Foreign Application Priority Data

Aug. 31, 2005   (AT) .............................. GM597/2005

(51) Int. Cl.
*B60K 17/16* (2006.01)
(52) U.S. Cl. ...................... 475/231; 475/246
(58) Field of Classification Search ................ 475/230, 475/246, 222; 280/124.156; 180/375
See application file for complete search history.

(56) References Cited

U.S. PATENT DOCUMENTS

| | | |
|---|---|---|
| 805,740 A | 11/1905 | Lowe |
| 3,365,984 A | 1/1968 | Musgrave |
| 4,469,188 A | 9/1984 | Mita |
| 4,781,259 A | 11/1988 | Yamaoka et al. |
| 5,560,268 A | 10/1996 | Young |
| 6,076,644 A | 6/2000 | Forrest et al. |
| 6,210,299 B1 | 4/2001 | Yoshioka |
| 6,261,202 B1 | 7/2001 | Forrest et al. |
| 6,354,979 B1 * | 3/2002 | Lohr ........................... 475/240 |
| 6,408,719 B1 | 6/2002 | Seki et al. |
| 6,547,027 B1 | 4/2003 | Kalhok et al. |
| 6,616,565 B1 | 9/2003 | Chen et al. |
| 6,780,137 B1 | 8/2004 | Langenfeld |
| 2001/0027890 A1 | 10/2001 | Bria et al. |
| 2003/0109350 A1 * | 6/2003 | Rutt et al. .................... 475/230 |
| 2005/0130785 A1 * | 6/2005 | Konda ......................... 475/230 |
| 2006/0237938 A1 * | 10/2006 | Imre et al. ............ 280/124.116 |

FOREIGN PATENT DOCUMENTS

| | | |
|---|---|---|
| DE | 1 035 491 | 7/1958 |
| DE | 1 039 373 | 9/1958 |
| EP | 0 773 390 B1 | 8/2001 |
| EP | 1 167 824 A2 | 1/2002 |
| GB | 19850 | 11/1913 |

(Continued)

*Primary Examiner*—Sherry L Estremsky
*Assistant Examiner*—Edwin A. Young
(74) *Attorney, Agent, or Firm*—Harness, Dickey & Pierce, P.L.C.

(57) ABSTRACT

A drive axle for a light vehicle includes a chain drive and a differential, which comprises a differential cage (2) with a long neck (6, 7) at both sides, balance pinion gears (13) and two axle pinion gears (16), with the axle pinion gears (16) being journaled radially and axially in the differential cage (2). Proximal ends of axle shafts (21, 22) are plugged in the axle pinion gears (16) and at the distal ends of the necks (6, 7) in radial bearings (19) of the differential cage (2) and are supported further outwardly in a fixed bearing (33, 34) connected to the vehicle. The axle pinion gears (16) have conical parts (17) at their rear side remote from the balance pinion gears (13) and can cooperate with a conical inner wall of the differential cage (2).

15 Claims, 1 Drawing Sheet

FOREIGN PATENT DOCUMENTS

| | | |
|---|---|---|
| GB | 792982 | 4/1958 |
| JP | 2002295640 | 10/2002 |
| JP | 2003254408 | 9/2003 |
| JP | 2003294109 | 10/2003 |
| JP | 2004218788 | 8/2004 |
| WO | WO 94/11653 | 5/1994 |
| WO | WO 97/33106 | 9/1997 |

* cited by examiner

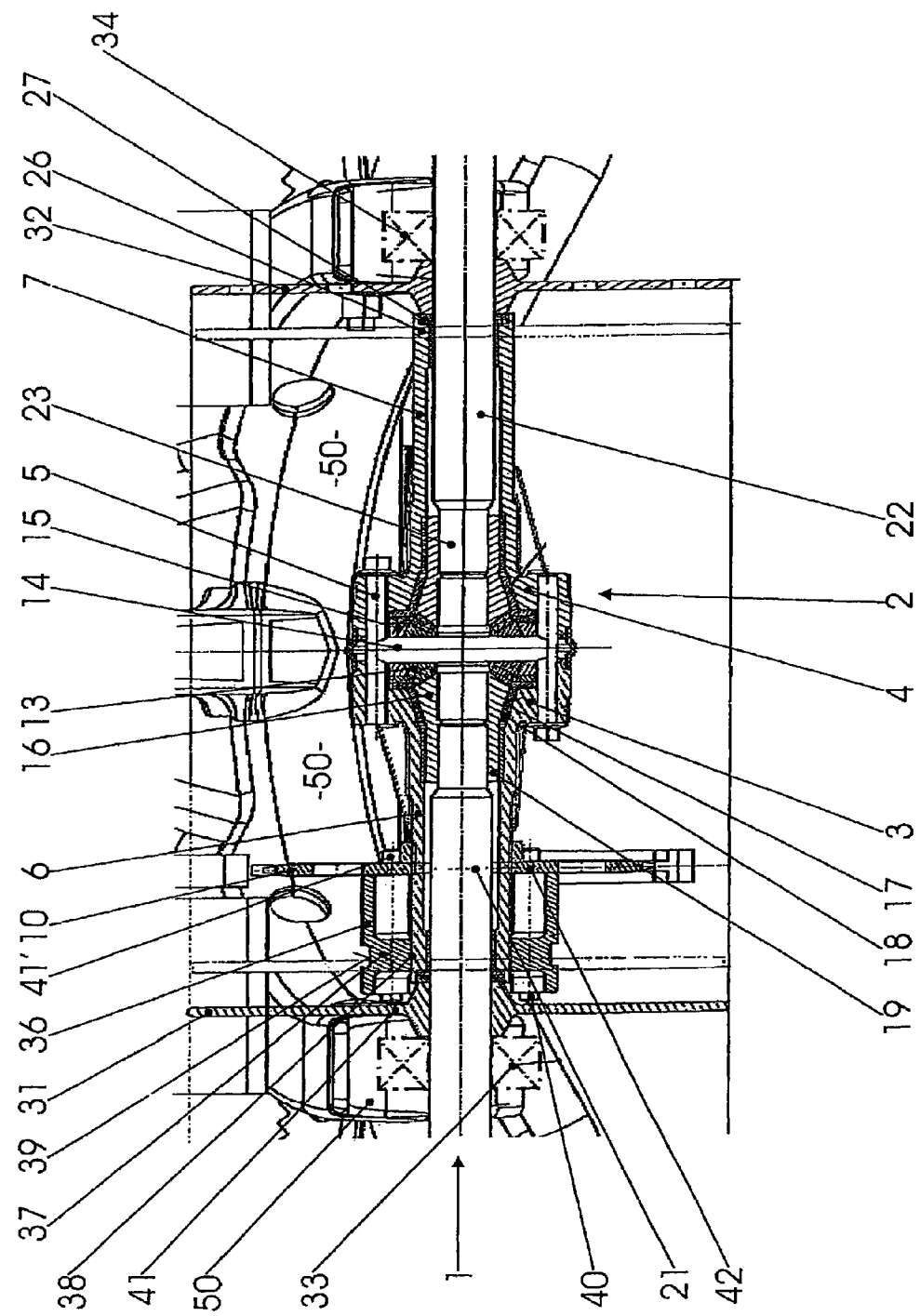

DRIVE AXLE FOR A LIGHT VEHICLE

CROSS-REFERENCE TO RELATED APPLICATIONS

This application claims the benefit of Austrian Utility Model No. GM 2005/0597, which was filed on Aug. 31, 2005, and the disclosure of which is incorporated herein by reference.

FIELD

The invention relates to a drive axle for a light vehicle having a chain drive and a differential. The light vehicle can be a two-track microcar, a go-kart or a so-called "quad" which the driver sits on as on a motorcycle and steers the wheels of the front axle by means of handlebars likewise based on a motorcycle. Vehicles of this type have, in their simplest form, a throughgoing drive axle without a differential; the two wheels are therefore rigidly connected to one another, with the drive axle being supported centrally in the vehicle or in a central axle beam. With this construction, the introduction of a differential is difficult because it separates the rear axle into two halves which would jackknife against one another.

BACKGROUND

A drive axle of this type is known from U.S. Pat. No. 6,210,299. It consists there of two half-axles made as a tube and inserted in a central tube, with the central tube bearing a ring gear and being supported in a differential case firmly connected to the vehicle or to a central beam. An input shaft meshing with the ring gear is supported in the differential case. The tube contains two balance gears of a differential, the half-axles are made as output pinion gears at their proximal (=central) ends and are clamped together by a threaded pin for their axial fixing. The effect of this threaded pin at different speeds of the two half-axles creates doubt in the performability of this design. The central support in the differential case impairs the driving properties and generates substantial transverse forces between the central tube and the half-axles which a bearing of the half-axles in the central tube would have to absorb, how is not set forth.

If light vehicles of this type are intended to satisfy higher demands, they require an apparatus for travel in difficult terrain which connects the two half axles to one another in a rotationally fixed manner and, due to its low directional stability, a partial differential lock dependent on torque difference for fast road travel.

SUMMARY

It is therefore the object of the invention to provide a drive axle with a fully or partly lockable differential which ensures good driving properties and is nevertheless light and cheap. This is achieved in accordance with the invention by the features of the independent claim.

There is thus no differential case present fixed to the vehicle. Instead, the rotating differential cage is simultaneously the case. The differential cage is not supported at its outside, but only on the axle shafts at its inside. The long neck of the differential cage at both sides supports the axle shafts over almost their total length so that a very stiff design results with a very light construction. The output pinion gears are journaled radially and axially in the differential cage and receive the proximal ends of the axle shafts in a rotationally fixed, but displaceable manner. The distal ends of the axle shafts are supported extremely outwardly in the necks and even further outwardly in a fixed bearing connected to the vehicle. The drive axle is thus not supported centrally, but outwardly in the vehicle. The bending moment exerted on it is thus kept small and the ride behavior of the vehicle improved. The bearing of the drive axle in the vehicle can be made both directly and indirectly via a beam pivotable around the lateral axle in the vehicle.

In a further development of the invention, the axle pinion gears are made conically at their rear side remote from the balance pinion gears and cooperate with a conical inner wall of the differential cage. In this manner, a partial differential lock dependent on the respectively transmitted torque is provided without any additional construction effort. The conical surfaces simultaneously also serve as a radial bearing. The transverse forces to be absorbed by these conical bearings are small due to the high stiffness of the axle and to the bearing in the vehicle at both sides. As a consequence, the inner wall of the differential cage can form a support surface of the axial bearing of the axis pinion gear, with its conical part and, optionally, also with an axis normal part as an axial bearing and, if required, with corresponding bearing bushings.

In a preferred embodiment of the invention, a chain sprocket is rotationally fixedly seated on a neck of the differential case. Since the neck extends very far outwardly, the chain sprocket can be arranged off-center, which is favorable for reasons of the disposition of the engine and the transmission and the ground clearance of the vehicle. In addition, the bending load of the drive axle can be kept low.

The arrangement in accordance with the invention also provides the condition for achieving the additional total differential lock with simple means and in a particularly elegant manner. For this purpose, first a brake disk is seated on the axle shaft between the radial bearing and the fixed bearing and a washer disk is provided between the distal end of the neck and the brake disk. The brake disk firmly seated on the axle shaft thus acts as an axial fixing inwardly and outwardly and is arranged in the proximity of the chain sprocket.

Thanks to this proximity, a selector sleeve displaceable on the neck can be arranged between the chain sprocket and the brake disk for the selective rotationally fixed connection of the chain sprocket and the brake disk. A reliable and easily engageable total lock is thus provided with very simple means. In an advantageous embodiment, the chain sprocket and the brake disk have bores arranged regularly over their periphery into which axially parallel pins fit which are distributed regularly in the selector sleeve over its periphery.

Further areas of applicability of the present disclosure will become apparent from the detailed description provided hereinafter. It should be understood that the detailed description and specific examples, while indicating the preferred embodiment of the present disclosure, are intended for purposes of illustration only and are not intended to limit the scope of the present disclosure.

BRIEF DESCRIPTION OF THE DRAWINGS

The invention will be described and explained in the following with reference to a FIGURE, which illustrates a cross-section of a drive axle in accordance with the present disclosure.

DETAILED DESCRIPTION

The following description of the preferred embodiment is merely exemplary in nature and is in no way intended to limit the present disclosure, its application, or uses.

The axle in accordance with the invention is designated as a whole by 1. It has a differential at its center whose differential cage 2 consists of a left hand (3) and a right hand (4) half 3, 4. The halves 3, 4 are screwed together by means of a number of threaded pins distributed over the periphery. The two halves continue away from the center at both sides in a neck 6, 7 which extends outwardly as far as possible. A chain sprocket 10 for the drive of the axle of an engine transmission unit of the vehicle (not shown) is seated rotationally fixedly on the left hand neck 6.

Two balance pinion gears 13 supported on a balance pin 14 and two axle pinion gears 16 meshing with them are located in the differential cage 2. The axle pinion gears 13 are supported in the radial direction in spherically shaped thrust bearings 15. The axle pinion gears 16 have a conical back 17, which cooperates with a conical surface of the differential housing 2 or with conical bearing bushings 18 respectively in the differential case 2, and a cylindrical part which outwardly adjoins it and serves as a radial bearing 19 with respect to the neck. The bearing bushings facilitate the tolerance compensation and can be replaced when worn. The cooperating conical surfaces 17 of the axle pinion gears 16 and of the differential cage 2 act as torque sensing friction locks for the differential. The torque transferred to the respective axle pinion gear 16 from the balance pinion gears 13 corresponds to an outwardly acting tooth force which increases the surface pressure and thus the friction between the conical surfaces. The degree of lock of this partial lock is dependent on the conical angle of the conical surfaces 17, 18 and on the material pairing of the friction surfaces. The conical surfaces 17 can additionally support the radial bearings 19.

A left hand axle shaft 21 and a right hand axle shaft 22 are plugged rotationally fixedly in the axle pinion gears, but axially displaceably in a coupling toothed arrangement 23. The furthergoing is only described for one side, but is the same on both sides. The axle shaft 22 does not need its own bearing at proximal (on the inner side), because it is plugged in the supported axle pinion gear there. If necessary, sufficient installation space for an additional radial bearing is present. The neck 7 of the differential cage 2 forms a distal (outer) radial bearing 26 at its outer end. The thrust bearing is sufficient there as a washer disk 27 which is supported at a brake disk 32 outwardly adjoining it. The brake disk 32 is fixedly connected, for example shrunk on, to the axle shaft 22 in the peripheral and axial directions. The axle bearings 33 (left) and 34 (right) adjoin the brake disks outwardly and support the whole axle in the vehicle or in an axle beam 50 of the vehicle. It is thus the brake disks 31, 32 which position the axle shafts 21, 22 with respect to the vehicle and to the differential case 2 in the axial direction. The differential cage 2 is only supported on the axle shafts 21, 22.

In addition to the partial friction lock of the differential, a total lock for off-road driving can also be realized with a low additional effort. For this purpose, a clutch sleeve 36 is axially displaceable with its hub 37 between the chain sprocket 10 and the adjacent brake disk 31, for example by means of a shift fork engaging into a peripheral groove 39. In addition, the hub 37 can also be rotationally fixedly connected to the neck by means of a coupling toothed connection. Depending on the arrangement, the brake disk can, however, also be rotationally fixedly connectable to the differential cage. pins 40 are provided as the shaped matching coupling elements and are preferably distributed over the periphery and engage into bores 41 of the brake disk when the lock is engaged. The pins 40 in the embodiment shown are so long that their inner ends 41' always engage into bores 42 of the chain sprocket 10.

The description of the present disclosure is merely exemplary in nature and, thus, variations that do not depart from the gist of the present disclosure are intended to be within the scope of the present disclosure. Such variations are not to be regarded as a departure from the spirit and scope of the present disclosure.

What is claimed is:

1. A drive axle for a light vehicle comprising:
   a chain drive; and
   a differential, wherein:
   the differential includes a differential cage with balance pinion gears and axle pinion gears at a side of a pair of necks, the axle pinion gears being radially journaled in the differential cage or the necks and being axially supported in the differential cage; and
   proximal ends of axial shafts are plugged rotationally fixedly and displaceably in the axle pinion gears, the axial shafts being supported in a radial bearing at a distal end of the necks of the differential cage and even further outwardly from the distal end of the necks in a fixed bearing connected to the vehicle, wherein a respective brake disk is seated on the axial shafts between the radial bearings and the axial bearings; and wherein a washer disk is provided between the distal end of the necks and the brake disks.

2. The drive axle in accordance with claim 1, wherein the axle pinion gears have conical parts at their rear side remote from the balance pinion gears that cooperate with a conical inner wall of the differential cage.

3. The drive axle in accordance with claim 1, wherein inner walls of the differential cage form a bearing surface for an axial bearing of the axle pinion gears.

4. The drive axle in accordance with claim 1, wherein a chain sprocket is fixedly seated on one of the necks of the differential cage.

5. The drive axle in accordance with claim 1, wherein a clutch sleeve displaceable on the necks is arranged between the chain sprocket and one of the brake disks for a selective rotationally fixed connection of the chain sprocket and the brake disk.

6. The drive axle in accordance with claim 5, wherein the chain sprocket and the brake disks have bores which are distributed regularly over their periphery and into which axially parallel pins in the coupling sleeve fit which are distributed regularly over its periphery.

7. A drive axle for a light vehicle, comprising:
   a differential including a differential cage having a neck that houses balance pinion gears meshed with axle pinion gears;
   a pair of shafts including a first end and a second end supported in said differential cage,
   a chain sprocket rotationally fixedly seated on the neck;
   a brake disk seated on at least one of the shafts; and
   a selector sleeve displaceable on the neck disposed between the chain sprocket and the brake disk to operate the differential in a locked mode, wherein the axle pinion gears are rotationally fixedly and displaceably coupled to the shafts at the first end of the shafts, and the neck supports the second end of the shafts.

8. The drive axle of claim 7, wherein the axle pinion gears are journaled radially and axially in the differential cage.

9. The drive axle of claim 7, wherein the axle pinion gears include a conical surface that cooperates with a corresponding conical inner wall of the differential cage.

10. The drive axle of claim 9, wherein the conical surface and conical inner wall simultaneously acts as a radial bearing.

11. The drive axle of claim 7, wherein the selector sleeve is operable to selectively fix the brake disk for rotation with the chain sprocket to restrict relative rotation between one of the shafts and the differential cage.

12. The drive axle of claim 7, wherein the chain sprocket and the brake disk each have bores arranged over a periphery thereof, the bores receiving axially parallel pins distributed on the selector sleeve.

13. A drive axle for a light vehicle, comprising:
   a chain drive;
   a differential having a cage containing balance pinion gears and axle pinion gears; and
   axle shafts having proximal ends fixed for rotation with the axle pinion gears, each axle shaft being supported for rotation by an axle bearing, wherein the cage is solely supported for rotation by the axle shafts and includes oppositely extending necks, each neck being supported for rotation by one of the axle shafts and having a distal end proximate one of the axle bearings;
   the drive axle further including brake disks fixed for rotation with the axle shafts, each brake disk being positioned between a distal end of one of the necks and the corresponding proximate axle bearing;
   wherein the brake disks restrict axial movement of the cage.

14. The drive axle of claim 13 further including a washer disk provided between the distal end of the necks and the brake disks.

15. The drive axle of claim 13 wherein a chain sprocket is fixedly seated on one of the necks of the differential cage between the proximal and distal ends of the neck.

* * * * *

UNITED STATES PATENT AND TRADEMARK OFFICE
CERTIFICATE OF CORRECTION

PATENT NO. : 7,604,562 B2
APPLICATION NO. : 11/514369
DATED : October 20, 2009
INVENTOR(S) : Thomas Gumpoldsberger It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 389 days.

Signed and Sealed this

Fifth Day of October, 2010

David J. Kappos
*Director of the United States Patent and Trademark Office*